United States Patent [19]
Gillman et al.

[11] 3,980,497
[45] Sept. 14, 1976

[54] SEPARATORS FOR ALKALINE BATTERIES
[75] Inventors: Leland M. Gillman, Denver; Robert E. Stark, Littleton, both of Colo.
[73] Assignee: The Gates Rubber Company, Denver, Colo.
[22] Filed: Aug. 3, 1970
[21] Appl. No.: 62,224

[52] U.S. Cl. .............................. 429/145; 429/131; 429/133
[51] Int. Cl.² ......................................... H01M 2/14
[58] Field of Search ................. 136/6, 30, 131, 145, 136/146, 28, 143

[56] References Cited
UNITED STATES PATENTS

| | | | |
|---|---|---|---|
| 1,209,298 | 12/1916 | Hoppie | 136/131 |
| 1,640,488 | 8/1927 | Deibel et al. | 136/131 |
| 2,890,261 | 6/1959 | Andre | 136/145 |
| 2,930,829 | 3/1960 | Jacquier | 136/143 |
| 2,942,057 | 6/1960 | Huber et al. | 136/145 |
| 3,463,669 | 8/1969 | Jammet | 136/146 |
| 3,513,033 | 5/1970 | Watanabe et al. | 136/146 |
| 3,558,358 | 1/1971 | Ropp | 136/28 |
| 3,573,106 | 3/1971 | Johnson et al. | 136/145 |

OTHER PUBLICATIONS
Ott et al., Cellulose and Cellulose Derivatives, Second Edition, by Interscience Publishers, Inc. N.Y., (1954), pp. 202–207.

Primary Examiner—Donald L. Walton
Attorney, Agent, or Firm—Curtis H. Castleman, Jr.; Raymond Fink; H. W. Oberg, Jr.

[57] ABSTRACT

A multi-layer separator for use in alkaline storage batteries is disclosed. In one aspect of the invention the separator comprises bibulous, non-membranous layers together with a coating of a relatively thin layer of a gelling agent applied to at least one side of one of the bibulous layers. In another aspect of the invention, outer bibulous, non-membranous layers sandwich and are bonded to a semi-permeable membranous layer with an adherent gelling agent to form a high-strength laminated separator.

These separators find use in a variety of alkaline galvanic cells, particularly in rechargeable cells such as nickel-cadmium, nickel-zinc, silver-zinc, manganese dioxide-zinc, and similar cells.

3 Claims, 3 Drawing Figures

SEPARATORS FOR ALKALINE BATTERIES

BACKGROUND OF THE INVENTION

This invention relates to separators for use in alkaline storage batteries, and particularly for use in batteries having electrode systems such as nickel-cadmium, nickel-zinc, silver-zinc, and manganese dioxide-zinc, in which the separator must be highly resistant to physical and chemical influences within the cell.

It has heretofore been common practice in the art of secondary alkaline cells to employ inter-electrode separators containing a plurality of layers, at least one of which is a membranous material such as cellophane. This membrane layer must be compatible with the alkaline electrolyte within the cell, be sufficiently permeable to allow passage of electrolyte ions, yet not be so highly permeable as to permit the passage of larger molecules or ions therethrough, e.g. electrode-derived conducting ions. Such membranous materials are particularly useful in attenuating the growth of zinc dendrites in alkaline rechargeable cells having zinc as the basis for the negative electrode. These dendrites or "trees" are produced at and propagated from the zinc electrode during charge, and eventually produce tree-like conductive branches which extend to the cathode, short out the cell and seriously reduce its life.

While cellophane and related membranous materials do retard such adverse metallic conduction between the electrodes of rechargeable alkaline cells, one extreme disadvantage is the result of the relatively fragile character of such membranes. For instance, during initial handling and separator assembly, the membranous material is easily creased, curls readily upon slight changes in humidity and may be punctured or other discontinuities or weak spots may be created. The occurence of such weak spots and discontinuities is also created during cell operation. For instance, compression of the separator often times results in projections completely severing the membrane or causes the occurence of folds and creases. These adverse phenomena are particularly common when there is freedom of movement of the membrane layers with respect to adjacent electrodes and particularly between contiguous separator layers themselves. It is important to have a separator material uniform throughout its surface. This uniformity is particularly critical in cells having zinc anodes in which dendritic growth has been a severe problem. It has been discovered that discontinuities in the membranous material are extremely conducive to zinc growth.

The most pertinent prior art may be found in the United States Patent Office Classification Class 136, Batteries. Particularly instructive references include the following Pat. Nos. 2,534,336; 2,858,353; 2,900,433; 2,904,615; 2,930,829; 2,994,728; 3,081,372; and Canadian Pat. No. 721,815.

In one aspect of this invention it is an object to produce a novel multi-layer separator in which the use of relatively fragile membranous layers is obviated entirely.

In another aspect of this invention, it is an object to produce a multi-layer separator containing at least one membranous layer in which this membranous layer is sandwiched between and tightly adheres to contiguous bibulous layers to provide strength and protection to the membranous layer during cell assembly and operation.

It is another object to provide a separator for alkaline batteries including a plurality of layers laminated together to form an integral separator material having mechanical integrity.

It is a further object to provide a separator resistant to dendrite propagation therethrough.

These, and other objects, are met and the disadvantages of the prior art are solved by employing the separator and its method of preparation according to the present invention as described herein.

SUMMARY OF THE INVENTION

Briefly described, one aspect of the invention comprises a novel separator construction for alkaline cells having at least two bibulous, non-membranous separator layers laminated together with a thin layer of a gelling agent, defined herein, which provides mechanical integrity to the separator layer and functions as a semi-permeable membrane. In another aspect of the invention, the separator is comprised of bibulous, non-membranous separator layers sandwiching and laminated to a membranous layer utilizing a gelling agent to provide an integral separator of mechanical integrity.

These separators have particular utility as interelectrode spacers in alkaline batteries in which a separator resistant to alkaline electrolyte, oxidation, dendrite growth and other degrading cell environmental factors are required.

PREFERRED EMBODIMENTS OF THE INVENTION

1. Bibulous layers

Figure 1:
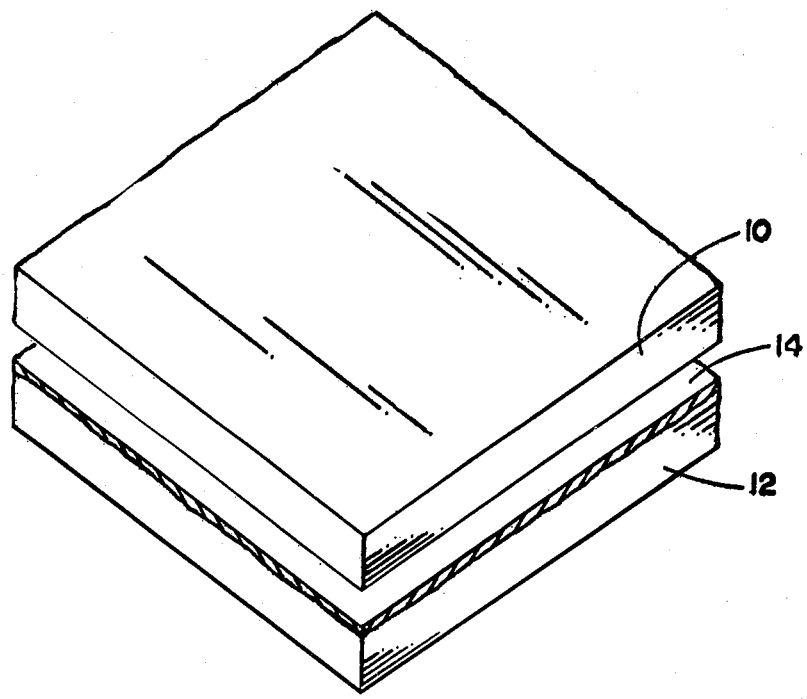
FIG. 1 is an exploded, perspective view of a separator configuration of the present invention in which bibulous separator layers are laminated together with a gelling agent.

Any of a number of commonly employed separators used in conventional alkaline cells may be employed, with certain limitations. Generally, these layers are bibulous in nature, highly retentive of the electrolyte employed, resistant to oxidation within the cell and mechanically strong. Importantly, these layers must be compatible with alkaline electrolyte, e.g. potassium or other alkali metal hydroxide, along with any additives employed. Useful bibulous materials include bonded or non-bonded natural or synthetic cellulosic materials exemplified by rayon, cotton, paper materials such as porous and microporous filter papers, or cellulosic esters such as cellulose acetate, et cetera. Examples of useful non-cellulosic materials include pressed styrene fibers, nylon, Pellon (manufactured by the Pellon Corporation), glass fiber, polyethylene, polytetrafluoroethylene (Teflon), acrylics such as Orlon and Acrylan, polyacrylonitrile and polyesters such as Dacron. Particularly preferred separators for prevention of dendritic growth are cotton cellulosic materials. These materials, as distinguished from conventional alkaline separators have a degree of polymerization preferably at least about 3500, and more preferably at least about 7500 as determined by ultracentrifugal measurement. (See High Polymers, V5, "Cellulose and Cellulose Derivatives," Interscience Publishers, 1954.) By degree of polymerization is meant the average number of anhydroglucose units per molecule.

In cells highly susceptible to dendritic growth, especially those containing zinc anodes (e.g. nickel-zinc cells) it is preferred to use non-reticulated, non-woven, microporous, and uniformly permeable cellulosic materials such as high grade filter papers. These materials are microporous and have a permeability to air of from about 0.1 to 100 and more preferably from about 0.5 to about 50 and most preferably 2.0 to about 10 cubic feet per minute per square footh of separator per one-half inch water pressure differential. The separator retains electrolyte (35 weight percent KOH) in the amount preferably from about 0.55 to about 0.95 and more preferably from about 0.7 to about 0.9 grams of electrolyte per cubic cm. of separator and included electrolyte. These materials have the ability to intimately conform to the electrode, lessen possibility of unabsorbed electrolyte volumes, discourage buildup of zincate pools, are highly retentive of electrolyte and are resistant to oxidation.

A further requirement of the particular bibulous layers employed is that they be compatible with and readily adherent to the gelling agent (herein later defined).

For most purposes, it is sufficient and preferred to employ only two bibulous layers, i.e. each contiguous to the opposite polarity electrodes. A greater number of bibulous layers may be utilized, but at least two of the layers are joined together by a suitable gelling agent.

2. Gelling agents

The gelling agents of the present invention serve the dual purpose of providing a barrier film or semi-permeable membrane through which ions permeate, but through which electrode materials are impermeable, and as a binding agent to render mechanical integrity and protection to the separator. In general, the gelling agent must be compatible with and substantially insoluble in alkaline electrolyte within the cell, retentive of electrolyte, resistant to oxidation, and capable of adhering to the aforementioned bibulous layers, or in another aspect of the invention, it must be additionally adherent to a semi-permeable membrane.

While it is critical that the gelling agents be resistant to degradation and substantially alkali insoluble within the cell and that they function as barrier films for electro-chemical conduction, the more preferred gelling agents of the present invention are of high molecular weight (high degree of polymerization), hydrophyllic polymers which readily form gels.

While a large variety of materials will satisfy the above requirements, examples of suitable materials include cellulose esters, exemplified by cellulose acetate; mixed cellulose esters exemplified by cellulose acetate propionate; carboxy methylcellulose and its salts, preferably its alkali metal salts; cellulose ethers exemplified by lower alkyl ethers, including methyl (Methocel) and ethyl (Ethocel) and carbocyclic including benzyl ethers; other cellulosic compounds exemplified by hydroxypropyl methyl cellulose; vinyl esters exemplified by vinyl acetate and its copolymers; salts of alginic acid, preferably alkali metal salts; additional miscellaneous compounds exemplified by rubber latex resin, silicates, ammonium lignosulfonate containing wood sugars, starch, hydrated Fuller's earth, ovalbumin, guargum, polyvinyl alcohol, polyethylene oxide and polyacrylic acid. Additional battery membrane-like separator materials which have the required gelling and compatibility characteristics are also useful, will be appreciated by those skilled in the art and are meant to be incorporated within the scope of this invention.

Preferred materials include the cellulosic materials. Compatible mixtures of the above may be utilized, e.g. methyl cellulose and sodium alginate.

3. Semi-permeable membrane

Typically, the membrane or barrier film is a film formed from thermoplastic materials, for example polyvinyl alcohol, polyvinyl chloride, polyethylene, polyvinyl acetate, cellulose, polyvinyl butyral, polystyrene and various forms of nylon. Regenerated cellulose, e.g. cellophane, is preferred. Certain of the materials are not naturally permeable in film form, but may be made so, as by incorporating a soluble salt or a plasticizer which can be subsequently leached out of the film. For instance, in order to make porous films of either ethyl cellulose or polystyrene which are not naturally permeable in film form, inorganic sulfates such as potassium sulfate may be incorporated in the films as the salts may readily be leached out of the film. Other conventional membranes may be employed.

4. Assembly of separator

Various separator embodiments of the present invention will be more completely understood by reference to the accompanying drawings.

In FIG. 1, two bibulous layers, 10 and 12, of the same or different material, are bonded together with a layer of gelling agent 14 to form a three-layer separator. The gel layer 14 may be applied to either or both of the bibulous layers 10 or 12 by any conventional means, such as by spraying, brush-painting, dip-coating, knife-coating, roll-coating with a gluing machine, calendering, or by extrusion coating, Formulation of the gelling agent is accomplished in conventional manner, as by dispersing the gelling agent within a suitable solvent. It may sometimes be necessary, depending on the particular wetting agent to employ physical means, such as agitation, to increase solubilization and uniformity of dispersion. Plasticizers, polymerizers, viscosity enhancing agents, cross-linking agents, or thixotropic agents may be added, if desired. The thermal gelation properties of the gelling agent can be controlled by agitation, temperature, concentration, the use of additives and in the case of the preferred cellulosic compounds of the present invention, by varying the number of substituents on the hydroxyl sites of the anhydroglucose units of the cellulose molecule. These and other related methods are well known to those skilled in the art.

The gel layer coating 14 may be allowed to dry prior to, or subsequent to, assembling the separator layers. Preferably, the bibulous layers may be compressed together while the gel coating layer is still sticky, as by hot pressing the layers into a single composite separator. Alternatively, either a single coating on layer 10 or 12, or a coating on each individual layer may be applied and allowed to dry without laminating the bibulous layers 10 and 12. Additional coated or uncoated separator layers may be superposed as desired.

Figure 2:
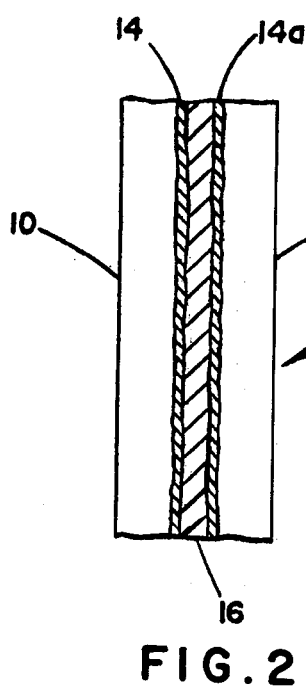
FIG. 2 depicts an enlarged sectional view of a laminated separator of the present invention in which cellophane is bonded to and sandwiched by adjacent bibulous layers.

In FIG. 2, the so-called "sandwich" separator embodiment is shown. In one method of assembling this separator, one of the bibulous paper layers 10 is roll-coated in a gluing machine in which a thin layer 14 of gelling agent is bonded to its surface. A membrane layer 16 of cellophane or other suitable material is pre-wetted in water and spread over the still sticky gel layer 14. It is important that the interface between the cellophane and coated bibulous layer be substantially uniform, lacking substantially the occurrence of creases or other weak spots. To this layer 16 is applied another paper layer 12 coated similarly with gel layer 14a. The composite sandwich layer 20 is hot pressed to form an integral smooth separator in which the membranous layer 16 is afforded complete protection by the adjacent bonded bibulous layers 10 and 12.

Figure 3:
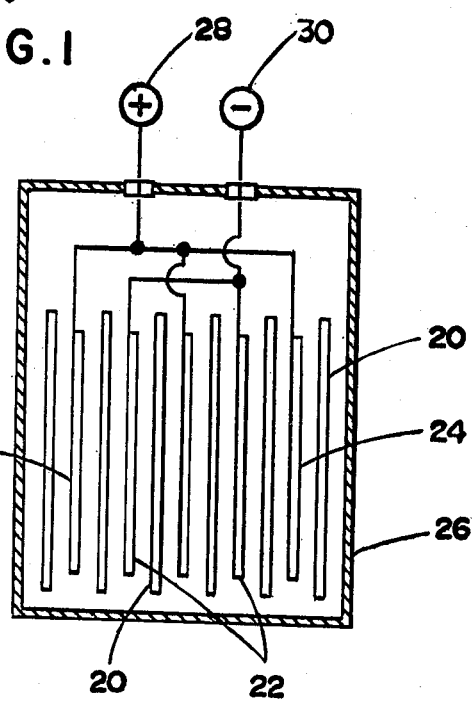
FIG. 3 is a diagrammatic sectional view of a rechargeable battery cell employing the novel separators of the present invention.

In FIG. 3, a typical sealed cell is shown in diagrammatic form, containing three positive electrodes 24 and two negative electrodes 22 arranged in a parallel stacked configuration. The desired pressure may be applied to the stack. The interelectrode space and space between the outer-most electrodes and cell casing 26 contain separators 20 of the present invention. The separators extend beyond the ends of the electrode plates to discourage dendrite growth between the plates. Current collection is obtained from contacts 18 and 30, insulatingly disposed.

5. Examples

The following working examples illustrate certain preferred aspects of the invention, as applied by way of example to the nickel-zinc type cell. The invention is not thereby limited to these illustrations.

EXAMPLE 1

A number of sealed pillbox cells are constructed, having one anode and two cathodes arranged in a horizontal parallel stack compressed to two-thirds (2/3) p.s.i. The cathodes are conventional nickel-sintered plates. The anode is of the pasted zinc variety, composed of 70 weight percent zinc powder, 25 weight percent zinc oxide as a charge reserve, and 5 weight percent mercuric oxide. In conventional manner, the anode ingredients are made plaint by addition of a suitable binder such as aqueous methyl cellulose and plasticizer. The resulting smooth paste is applied to a metallicly conductive, expanded mesh, allowed to dry and made smooth.

Two types of separators are assembled. Type a consists of two layers of high-grade, cotton fiber based filter paper enclosing a single layer of cellophane. Type B differs from Type A in that the three layers are laminated together with a gelling agent according to the present invention; a bibulous layer of filter paper is roll-coated on one side with a viscous solution of methyl cellulose; a pre-soaked (in water) layer of cellophane is placed on the sticky bibulous layer, carefully smoothing the cellophane; onto this composite layer is placed an additional bibulous layer coated with sticky methyl cellulose to form a composite separator; this separator is hot pressed to form the laminated separator. Three Type A and six Type B cells are repeatedly discharged to approximately 50 percent of nominal capacity and then recharged. In both cells, the mid life voltage is about 1.6 volts. However, the average cell life of Type A is 223 cycles, while the average cell life of Type B is 320 cycles.

EXAMPLE II

The same procedure of assembling pillbox cells as in Example 1 is employed. In this Example, two additional separators are tested, both of which lack a cellophane layer. Type C is composed of two layers of high-grade filter paper without any gel layer. Type D is the same as Type C except that the two bibulous layers are bonded together with a gelling agent composed of 5 weight percent methylcellulose according to the procedure of Example 1. Three cells of Type C had a mid life voltage of 1.70 volts and a discharge/charge life of 29 cycles. In contrast, three cells of Type D had a mid life voltage of 1.55 volts and a cycle life of 180.

6. Modifications of the invention

It should be understood that the invention is capable of a variety of modifications and variations which will be made apparent to those skilled in the art by a reading of the specification and which are to be included within the scope of the claims appended hereto.

What is claimed is:

1. A rechargeable electrochemical cell containing alkaline liquid electrolyte, at least one cathode, and at least one zinc anode subject to dendritic growths on charge, and in combination therewith an improved all cellulosic separator material interleaved between said anode and cathode and comprising:
    a. a first microporous and uniformly permeable bibulous layer adjacent to and in contact with the anode and having the characteristic of highly retaining electrolyte in the amount from about 0.55 to about 0.95 grams of alkaline electrolyte per cubic centimeter of separator, said bibulous layer formed of cotton cellulosic fibers;
    b. A second such bibulous layer adjacent to and in contact with the cathode; and
    c. A semi-permeable membrane formed of regenerated cellulose interposed between said first and second bibulous layers and uniformly bonded substantially throughout its surface to each of said bibulous layers with a thin layer of gelling agent to form a composite laminated separator.

2. The cell of claim 1 wherein both of said first and second bibulous layers are comprised of at least one layer of a fine grade cotton-based filter paper.

3. In a rechargeable electrochemical cell containing alkaline liquid electrolyte, a cathode, and a zinc anode material subject to dendritic growths on charge, an improved separator material interleaved between said zinc anode and cathode comprising in combination therewith:
    a. a first uniformly microporous and permeable to electrolyte bibulous layer adjacent to and in contact with the zinc anode, said cellulosic layer having a degree of polymerization of at least about 3500 as determined by ultracentrifugal measurement;
    b. a second such cellulosic bibulous layer adjacent to and in contact with the cathode; and
    c. a semi-permeable membrane interposed between said first and second cellulosic bibulous layers and uniformly bonded substantially throughout its surface to each of said bibulous layers with a thin layer of gelling agent to form a composite laminated separator.

* * * * *